United States Patent
Hori et al.

(10) Patent No.: US 10,406,919 B2
(45) Date of Patent: Sep. 10, 2019

(54) DISPLAY AUDIO DEVICE

(71) Applicant: Kojima Industries Corporation, Toyota-shi, Aichi (JP)

(72) Inventors: Hayato Hori, Toyota (JP); Shigenori Yoshimura, Toyota (JP)

(73) Assignee: KOJIMA INDUSTRIES CORPORATION, Toyota-Shi, Aichi (JP)

(*) Notice: Subject to any disclaimer, the term of this patent is extended or adjusted under 35 U.S.C. 154(b) by 0 days.

(21) Appl. No.: 15/510,020

(22) PCT Filed: Sep. 11, 2014

(86) PCT No.: PCT/JP2014/074100
§ 371 (c)(1),
(2) Date: Mar. 9, 2017

(87) PCT Pub. No.: WO2016/038723
PCT Pub. Date: Mar. 17, 2016

(65) Prior Publication Data
US 2017/0297430 A1   Oct. 19, 2017

(51) Int. Cl.
*B60K 35/00*   (2006.01)
*B60R 11/02*   (2006.01)
(Continued)

(52) U.S. Cl.
CPC ............ *B60K 35/00* (2013.01); *B60K 37/06* (2013.01); *B60R 11/0241* (2013.01);
(Continued)

(58) Field of Classification Search
None
See application file for complete search history.

(56) References Cited

U.S. PATENT DOCUMENTS 5,510,957 A * 4/1996 Takagi ............... H04B 1/082
174/50
5,537,673 A * 7/1996 Nagashima .......... H04B 1/3805
455/346

(Continued)

FOREIGN PATENT DOCUMENTS

DE   102008018551 A1 * 10/2009 ............... B60R 7/06
JP        10226281 A       8/1998
(Continued)

OTHER PUBLICATIONS

International Searching Report corresponding to Application No. PCT/JP2014/074100; dated Oct. 7, 2014, with English translation.
(Continued)

*Primary Examiner* — Zhiyu Lu
(74) *Attorney, Agent, or Firm* — Cantor Colburn LLP

(57) ABSTRACT

This DA device is installed in a vehicle and works in tandem with a portable information terminal in outputting information, said DA device being provided with: a main body section; a display section that can be opened and closed relative to the main body section; a holder part for holding the information terminal, said holder part being connected to the back surface of the display section and opening and closing together with the display section; an electric circuit that is housed in the main body section; and an opening and closing mechanism for switching the display section between an open state in which the holder part is exposed to the outside of a case and a closed state in which the holder part is inside the case.

4 Claims, 12 Drawing Sheets

(51) Int. Cl.
*H04B 1/3822* (2015.01)
*H04B 1/3888* (2015.01)
*B60K 37/06* (2006.01)

(52) U.S. Cl.
CPC ......... *H04B 1/3822* (2013.01); *H04B 1/3888* (2013.01); *B60K 2350/106* (2013.01); *B60K 2350/1028* (2013.01); *B60K 2350/352* (2013.01); *B60K 2350/405* (2013.01); *B60K 2350/406* (2013.01)

(56) References Cited

U.S. PATENT DOCUMENTS

| | | | | |
|---|---|---|---|---|
| 5,575,544 | A * | 11/1996 | Hasegawa | H04B 1/082 312/7.1 |
| 5,610,376 | A * | 3/1997 | Takagi | E05B 47/0002 200/50.01 |
| 5,974,333 | A * | 10/1999 | Chen | B60R 11/0241 455/346 |
| 6,193,538 | B1 * | 2/2001 | Amari | B60R 11/02 361/814 |
| 7,062,300 | B1 * | 6/2006 | Kim | B60R 11/0241 379/454 |
| 7,580,254 | B2 | 8/2009 | Anderson | G06F 1/181 312/223.2 |
| 8,439,417 | B2 * | 5/2013 | Andersson | B60K 37/06 224/483 |
| 2006/0277555 | A1 * | 12/2006 | Howard | B60R 11/0211 720/600 |
| 2008/0025526 | A1 | 1/2008 | Iwade | |
| 2009/0132130 | A1 * | 5/2009 | Kumon | B60K 35/00 701/49 |
| 2009/0316057 | A1 * | 12/2009 | Campbell | B60K 35/00 348/837 |
| 2010/0070985 | A1 | 3/2010 | Furumi et al. | |
| 2011/0150236 | A1 * | 6/2011 | Uchida | B60R 11/02 381/86 |
| 2011/0156637 | A1 * | 6/2011 | Thorsell | B60N 3/002 320/108 |
| 2012/0250878 | A1 * | 10/2012 | Ito | B60R 11/0205 381/86 |
| 2015/0002991 | A1 * | 1/2015 | Vander Sluis | B60R 11/0235 361/679.01 |

FOREIGN PATENT DOCUMENTS

| | | |
|---|---|---|
| JP | 2008024259 A | 2/2008 |
| JP | 2008189031 A | 8/2008 |
| JP | 2010058720 A | 3/2010 |
| JP | 2011129229 A | 6/2011 |
| JP | 2012015574 A | 1/2012 |

OTHER PUBLICATIONS

Written Opinion of the International Searching Authority corresponding to Application No. PCT/JP2014/074100; dated Oct. 7, 2014.

JP Notice of Grounds for Rejection corresponding to Application No. 2016/547323; dated Nov. 28, 2017.

* cited by examiner

DISPLAY AUDIO DEVICE

This is the U.S. national stage of application No. PCT/JP2014/074100, filed on Sep. 11, 2014, the disclosure of which is incorporated herein by reference.

TECHNICAL FIELD

The present disclosure relates to a display audio apparatus which is equipped in a vehicle and which cooperates with a multifunctional portable phone to display information.

BACKGROUND

In the related art, there has been proposed provision, on a vehicle, of an audio-visual apparatus (hereinafter referred to as "AV apparatus") which outputs video and sound, a navigation apparatus which provides route information, or the like. However, there has been a problem in that the AV apparatus and navigation apparatuses dedicated for equipment on a vehicle are expensive.

In consideration of this, there is proposed use of a multifunctional portable terminal such as, for example, a smartphone or the like in place of the AV apparatus or the navigation apparatus dedicated for equipment on the vehicle. Specifically, it is proposed to install navigation software and player software of music or video in the smartphone or the like, and to carry the smartphone into the vehicle.

In addition, in recent years, display audio apparatuses (hereinafter referred to as "DA apparatuses") which cooperate with the smartphone are also proposed. The DA apparatus is electrically connected to the smartphone, displays an output from the smartphone on a display, and inputs an operation received from the user into the smartphone. Such a DA apparatus has a display at a position easily viewable from the driver, such as on the dashboard. By displaying information from the smartphone on the DA apparatus, it becomes possible for the user to more comfortably handle various information. Further, such a DA apparatus can be formed inexpensively compared to the AV apparatus and the navigation apparatus dedicated for vehicle equipment.

SUMMARY

Technical Problem

In the DA apparatus of the related art, however, the smartphone is set on a cradle (docking station) placed outside the DA apparatus; for example, on the dashboard, and is exposed to the outside. In this case, the smartphone and the cradle may disturb the unified look of the interior of the vehicle, and have caused inferior appearance. In addition, depending on the location of placement of the cradle, there have been possibilities that human hands and fingers may contact the smartphone and the cradle, resulting in damages, or that the smartphone or the like may block the field of view. In addition, in this configuration, a part of a harness which electrically connects the smartphone and the DA apparatus is also exposed to the outside, which also results in inferior appearance, hooking of the hands and fingers, or the like.

An advantage of the present disclosure lies in the provision of a DA apparatus which can reliably prevent appearance degradation and hooking of hands and fingers.

Solution to Problem

According to one aspect of the present disclosure, there is provided a display audio apparatus that is equipped on a vehicle and that cooperates with a transportable information terminal to output information, the display audio apparatus comprising: a main body that is fixed on a fixed member; a display that can be opened and closed with respect to the main body; a holder that holds the information terminal, that is connected to a back surface of the display, and that is opened and closed with the main body; an electric circuit that is provided on the main body, that displays, on the display, information which is output from an information terminal held on the holder, and that transmits an operation instruction from a user to the information terminal; and an open/close mechanism that switches the display between an open state in which the holder is exposed to an outside of the case and a closed state in which the holder is positioned inside the case.

According to another aspect of the present disclosure, the open/close mechanism comprises an urging member that urges the display forward, wherein the urging member moves the display in an open direction when the closed state is released, and causes the information terminal held on the holder to closely contact a wall surface of the holder in the closed state.

According to another aspect of the present disclosure, the apparatus further comprises a harness that electrically connects the information terminal held on the holder and the electric circuit, wherein, in the closed state, the harness is stored in the case in a connected state to the information terminal.

Advantageous Effects of Invention

According to various aspects of the present disclosure, because the display is set to be openable/closable and the holder that holds the information terminal is provided on the back surface of the display, the information terminal can be stored in the DA apparatus. As a result, the appearance degradation and hooking of hands and fingers can be more reliably prevented.

DESCRIPTION OF EMBODIMENTS

Figure 1:
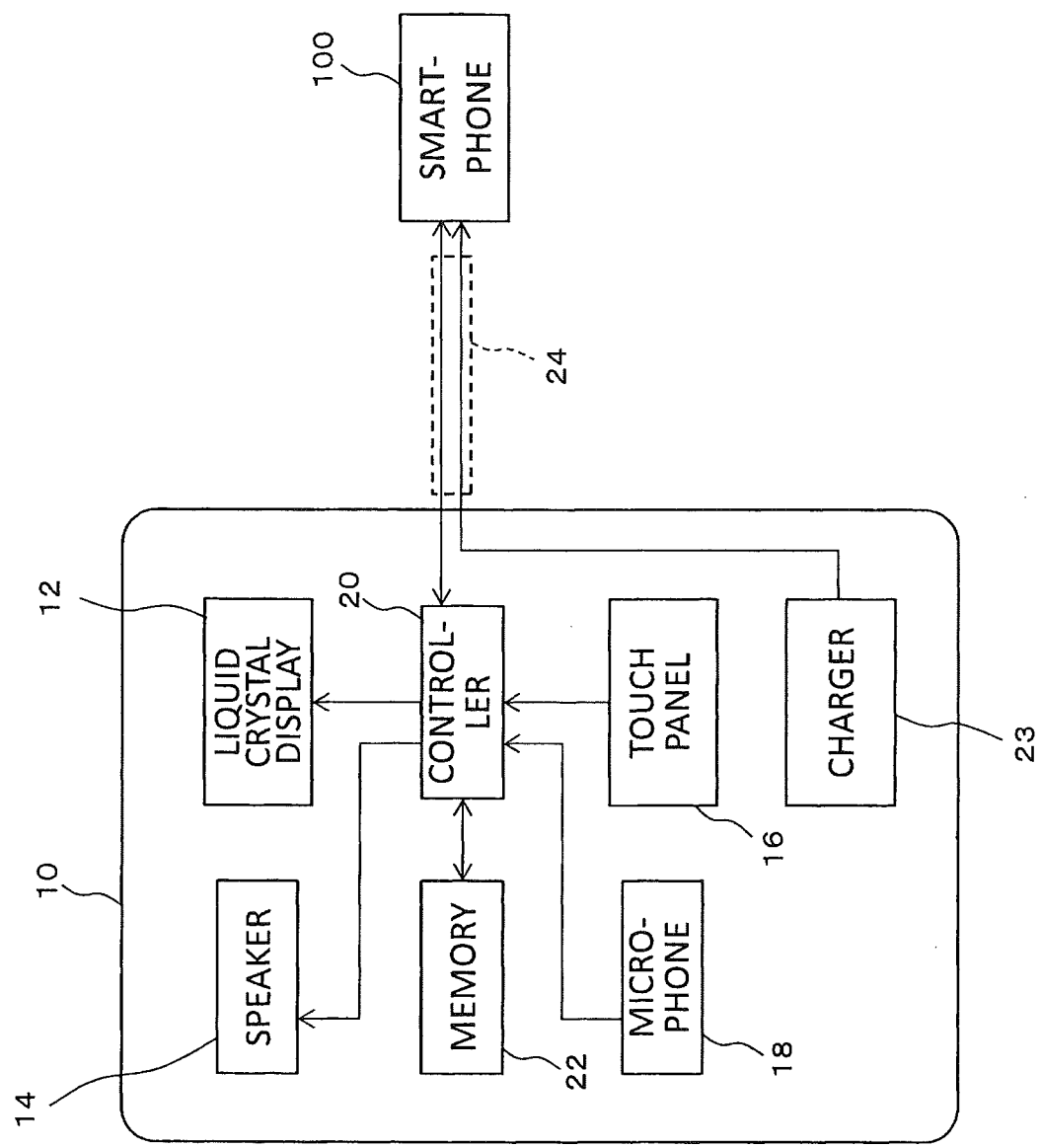
FIG. 1 is a block diagram showing an electrical structure of a DA apparatus according to an embodiment of the present disclosure.

An embodiment of the present disclosure will now be described with reference to the drawings. FIG. 1 is a block diagram showing an electrical structure of a display audio apparatus (hereinafter referred to as "DA apparatus") 10 according to an embodiment of the present disclosure.

The DA apparatus 10 is a device that cooperates with a smartphone 100 which is a transportable information terminal, outputs information which is output from the smartphone 100, and inputs an operation received from a user to the smartphone 100. On the smartphone 100 there are installed, for example, navigation software for guiding a route, player software for outputting video or music, or the like. The DA apparatus 10 launches software designated from the user among the software installed in the smartphone 100, and displays on a display 26 of the DA apparatus 10 information which is output from the smartphone 100 (for example, a route guide screen, a route guide sound, a music sound, video).

As shown in FIG. 1, a controller 20 of the DA apparatus 10 is electrically connected to the smartphone 100 via a harness 24. The harness 24 is a cable complying with an HDMI (registered trademark) standard. The harness 24 is electrically connected to the controller 20 for exchange of signals. In addition, the harness 24 also functions as an electric power supplying harness for the smartphone 100, and is also electrically connected to a charger 23.

The controller 20 drives a liquid crystal display 12 and a speaker 14 according to a video signal and a sound signal supplied from the smartphone 100, to output video and sound. The controller 20 also generates an operation signal based on a touch operation detected by a touch panel 16 and outputs the operation signal to the smartphone 100. When the smartphone 100 has a sound operation function, a microphone 18 may be provided on the DA apparatus 10, and a sound signal collected by the microphone 18 may be sent to the smartphone 100 as an operation signal. In addition, although not shown in FIG. 1, the DA apparatus 10 may include a simple operation device such as, for example, a switch, a button, a volume switch, a keyboard, or the like. A memory 22 stores a program for driving the DA apparatus 10, control parameters, and the like.

Figure 2:
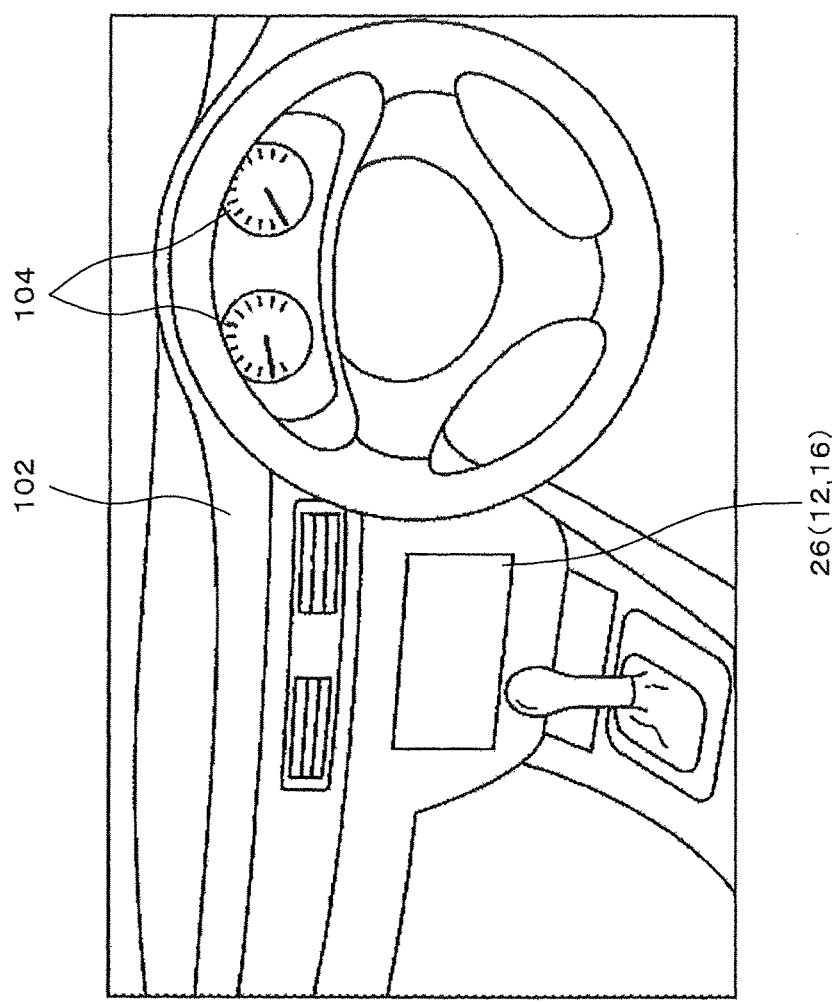
FIG. 2 is a diagram showing assembly of the DA apparatus in a vehicle.

As shown in FIG. 2, the DA apparatus 10 having such a structure is assembled in a position in the car cabin of the vehicle where the occupants can easily see; for example, a position adjacent to the instrument panel on the dashboard 102. A main body (not viewable in FIG. 2) of the DA apparatus 10 is embedded inside the dashboard 102, and normally, of the DA apparatus 10, only a panel 40 (refer to FIG. 3) forming the display 26 (that is, the liquid crystal display 12 on which the touch panel 16 is provided) is exposed to the outside. In this manner, by assembling the DA apparatus 10 in a state where only the display 26 is exposed, it becomes possible to prevent unintentional contact of the hands and fingers of the user on the DA apparatus 10 and blocking of the field of view of the user by the DA apparatus 10. Meanwhile, because various types of information can be provided with a screen larger than the smartphone 100 and a speaker having a higher performance than that of the smartphone 100, the user can more comfortably use various software (navigation software and player software) installed in the smartphone 100.

In the related art, the smartphone 100 connected to the DA apparatus 10 is placed outside the DA apparatus 10. That is, in the related art, a docking station, or a cradle, of the smartphone 100 is placed on an outer surface of the dashboard 102, and the smartphone 100 is attached to the cradle. In this case, the smartphone 100 is positioned in a manner protruding from the dashboard 102. As a result, the unified look of the interior in the car cabin is disturbed, appearance is degraded, and unintentional contact of the hands and fingers of the user on the smartphone 100 and the cradle may occur, possibly resulting in damages and erroneous operations of the smartphone 100 or the like. Moreover, there has been a possibility that the smartphone 100 protruding to the outside blocks the field of view of the user. Furthermore, in this case, the harness 24 which electrically connects the smartphone 100 and the DA apparatus 10 is also exposed to the outside. The harness 24 exposed to the outside in this manner may degrade the appearance, and possibly hook the user's hands and fingers, also resulting in damages and erroneous operations of the smartphone 100 and the DA apparatus 10.

Figure 3:
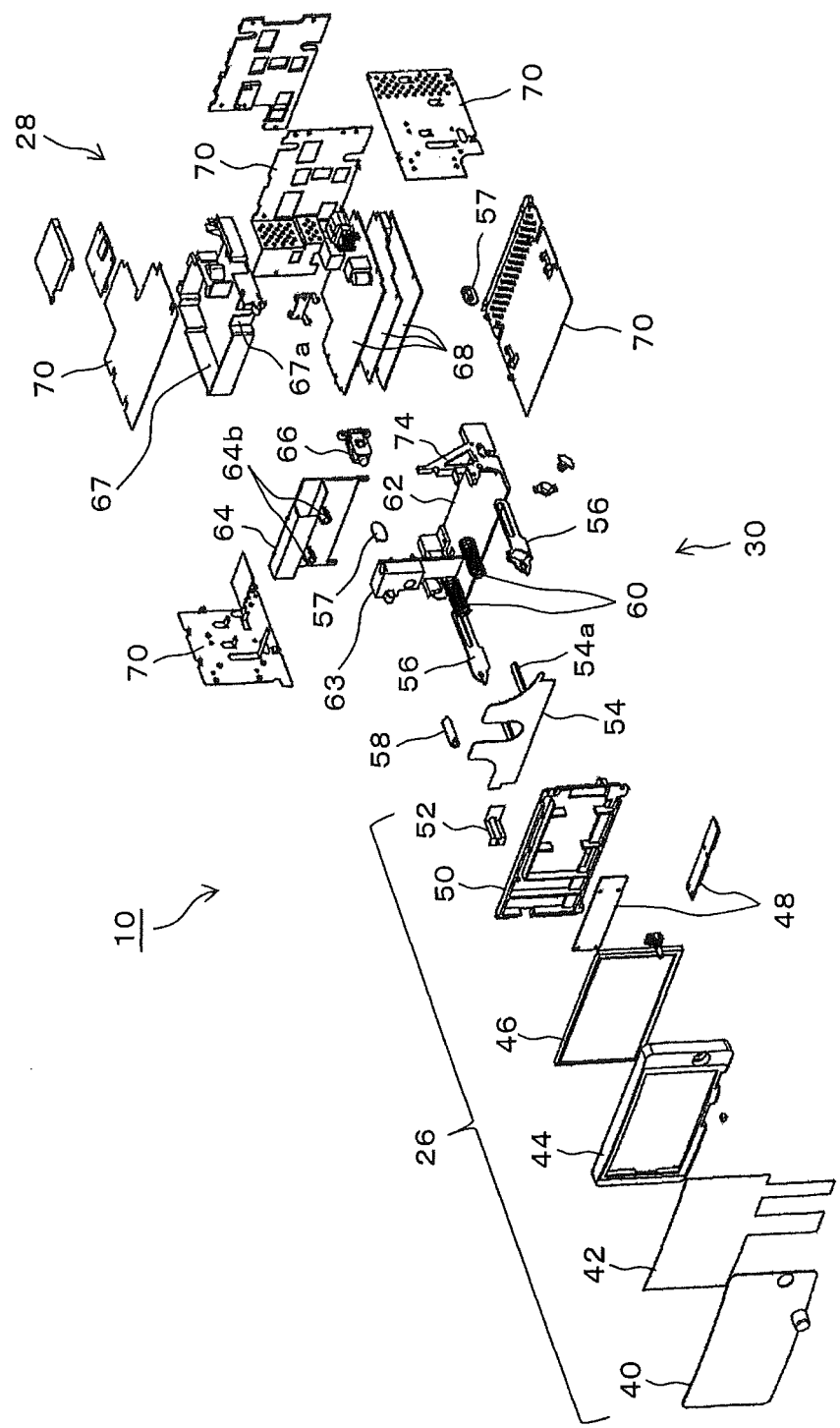
FIG. 3 is an exploded perspective view of the DA apparatus.
Figure 4:
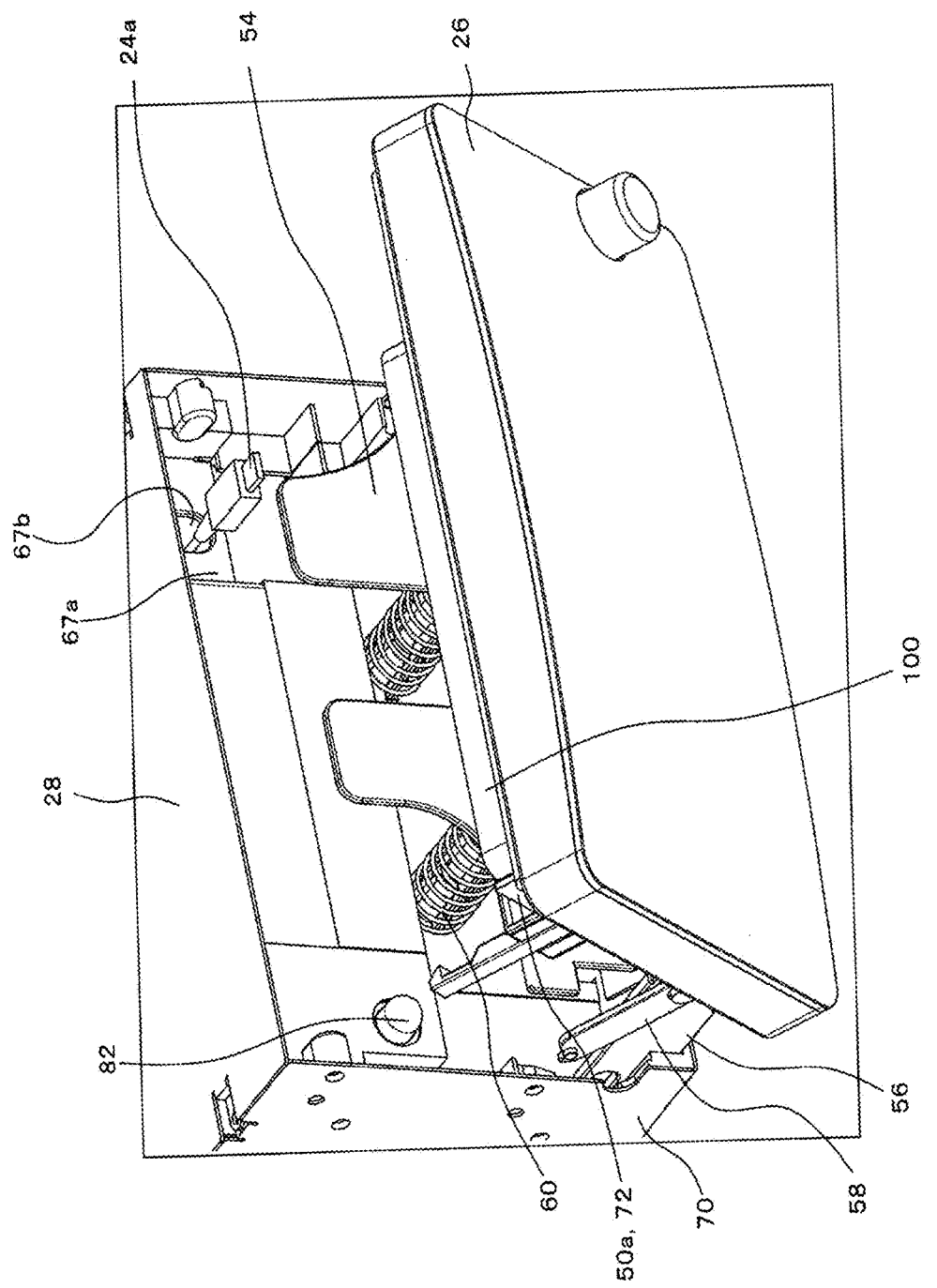
FIG. 4 is a perspective view of the DA apparatus in an open state.
Figure 5:
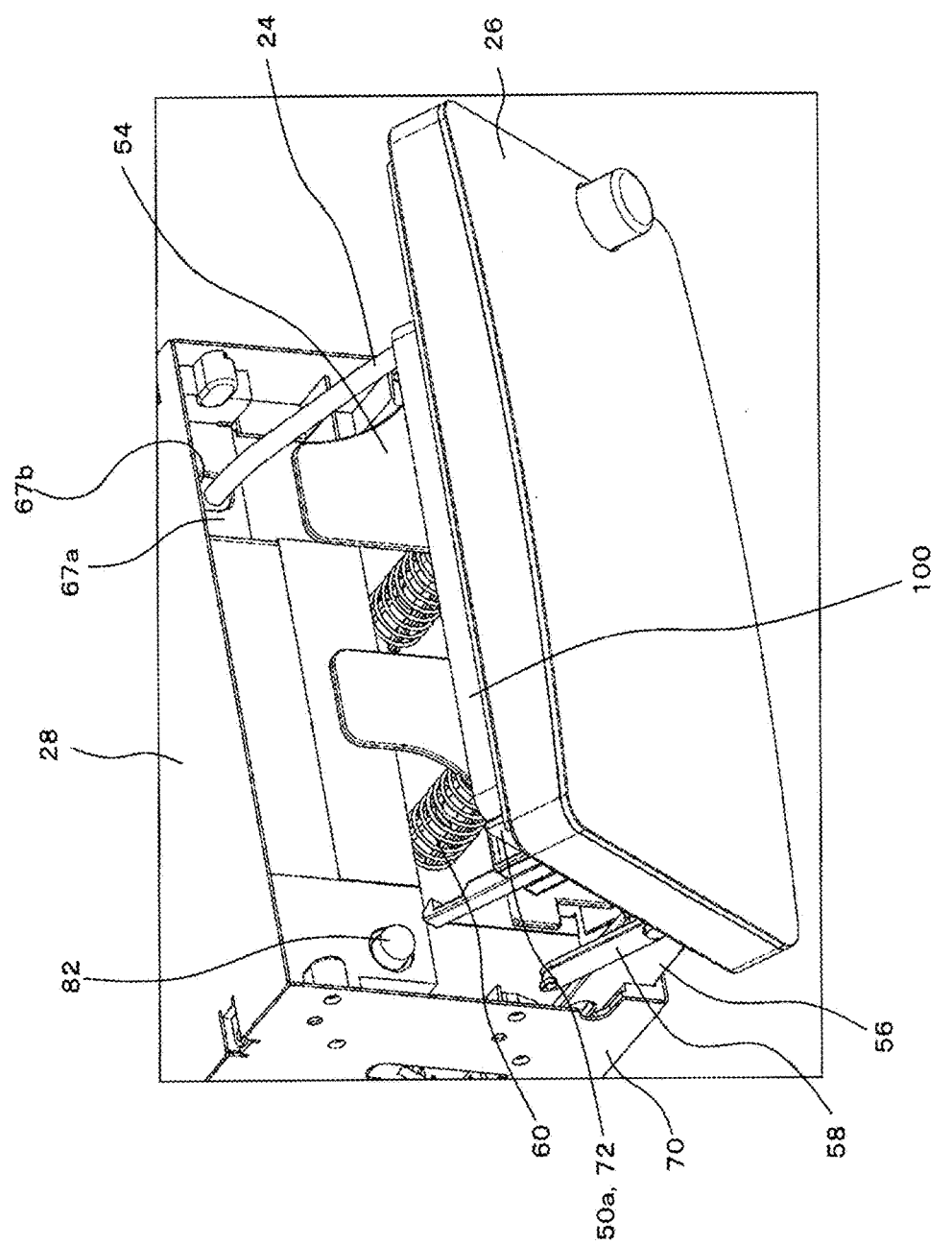
FIG. 5 is a perspective diagram of the DA apparatus in the open state.
Figure 6:
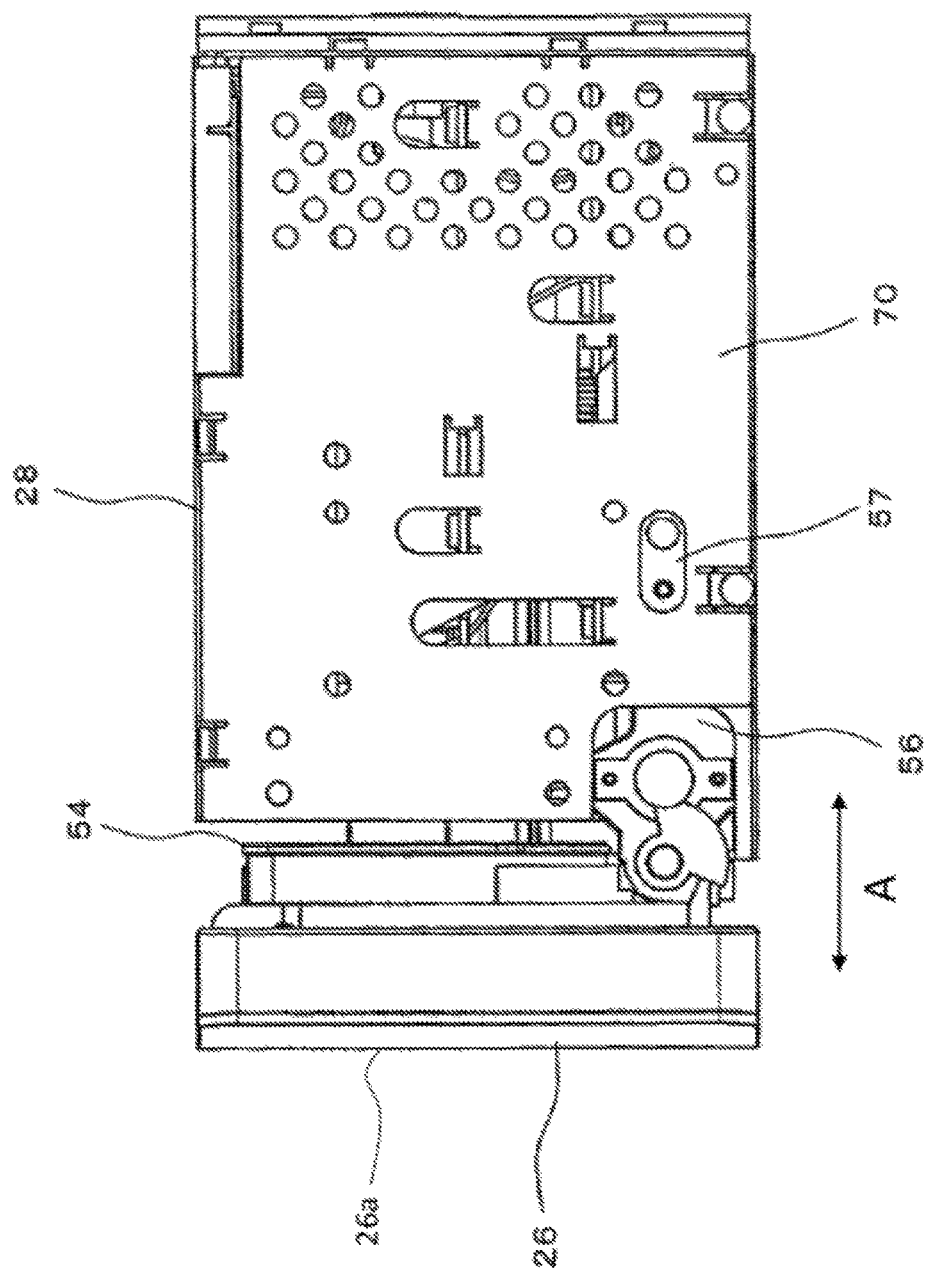
FIG. 6 is a side view of the DA apparatus in a closed state.
Figure 7:
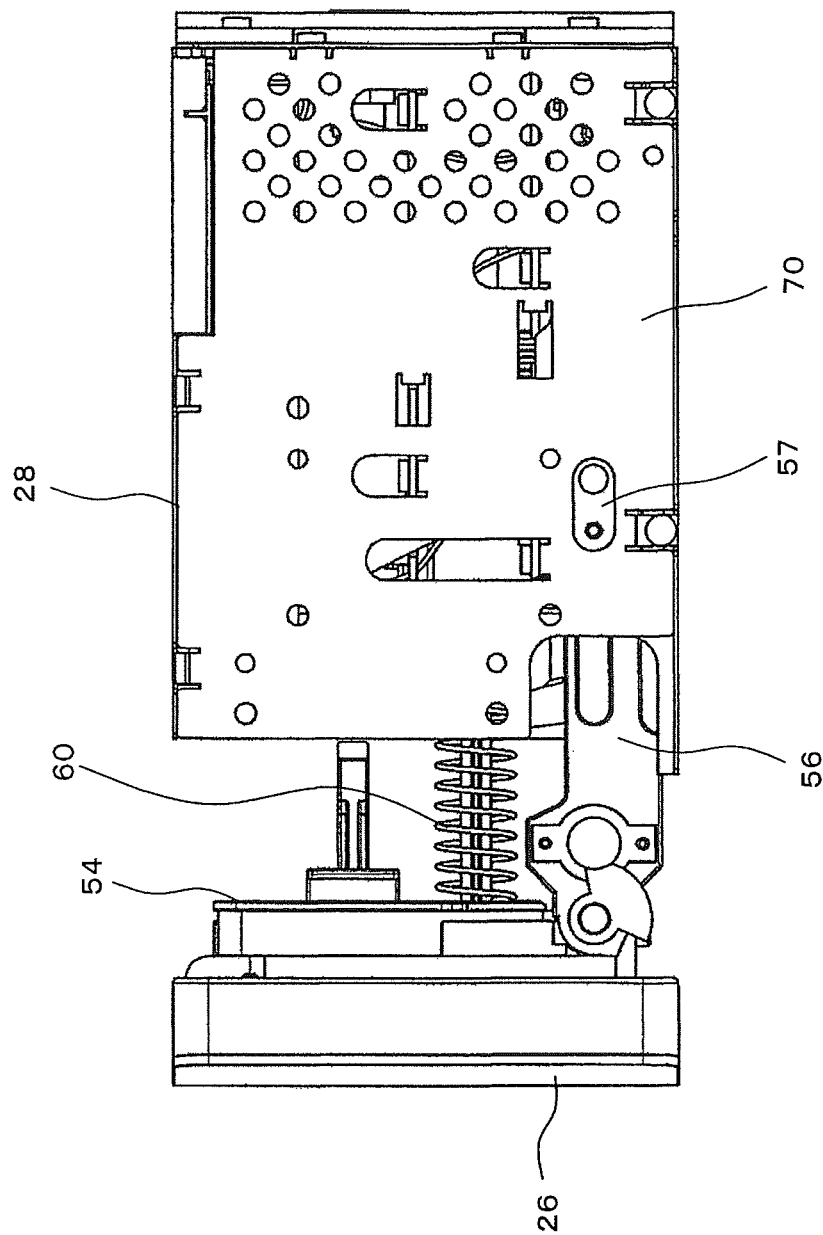
FIG. 7 is a side view of the DA apparatus during an opening operation.
Figure 8:
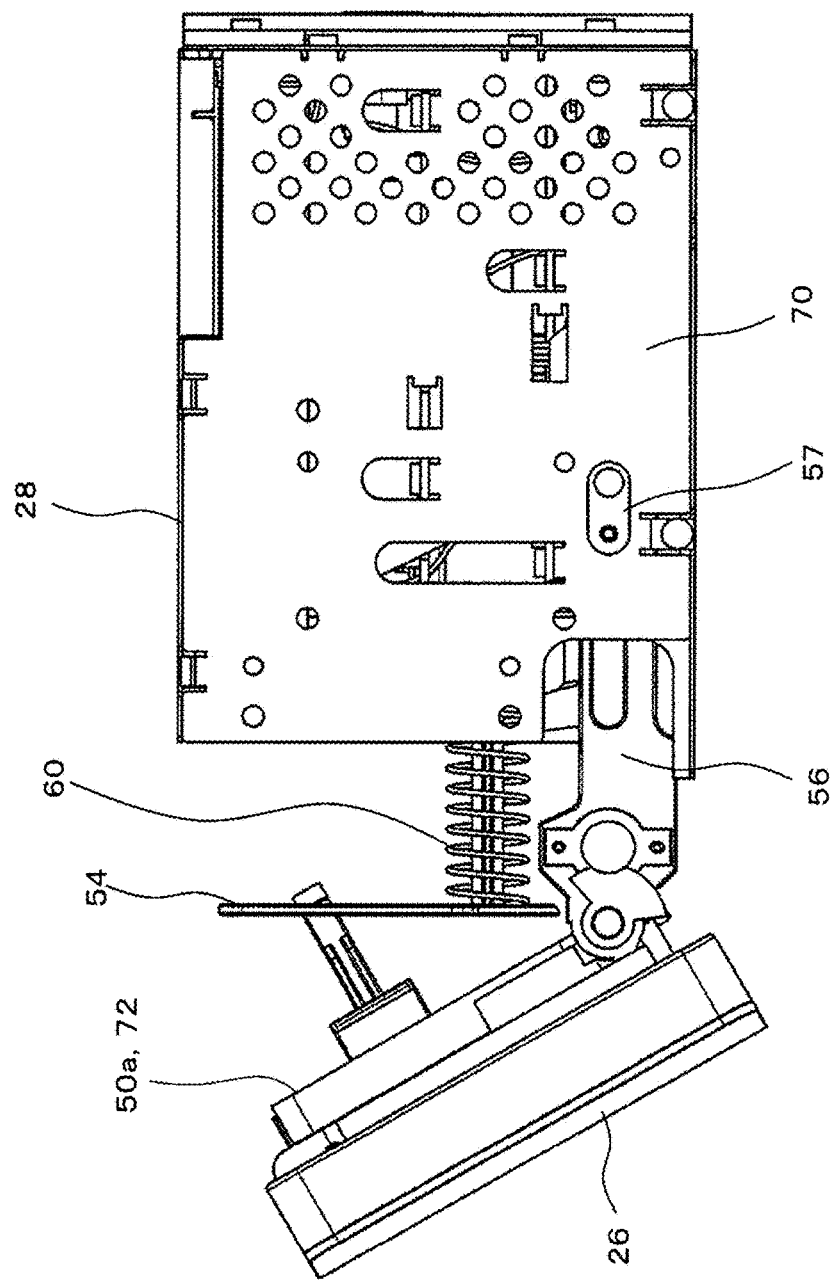
FIG. 8 is a side view of the DA apparatus after completion the opening operation.

In consideration of this, in the present embodiment, a holder that holds the smartphone 100 is provided at the back of the display 26. This will now be described with reference to FIGS. 3-7. FIG. 3 is an exploded perspective view of the DA apparatus 10. FIGS. 4 and 5 are perspective views of the DA apparatus 10 in which the display 26 is set in an open state. FIG. 6 is a side view of the DA apparatus 10 in a closed state, FIG. 7 is a side view of the DA apparatus 10 during an opening operation, and FIG. 8 is a side view of the DA apparatus 10 after completion of the opening operation.

The DA apparatus 10 can be largely divided into a main body 28 embedded in and fixed on the dashboard 102, and the display 26 which can be opened and closed with respect to the main body 28. The display 26 is formed by assembling the panel 40, and an electrode 42, a relay board 48, and a TFT 46 which form a touch panel onto a housing 44 made of a resin or the like, and covering the back with a cover 50 (refer to FIG. 3). In the present embodiment, a holder unit 72 for holding the smartphone 100 is formed on a back surface of the cover 50 covering the back of the display 26 (refer to FIG. 4). As shown in FIG. 4, the holder unit 72 is formed from a frame member 50a formed corresponding to a shape of the smartphone 100. Alternatively, the holder unit 72 may be members of other forms, for example, a member surrounding only the four corners of the smartphone 100, in place of the frame member 50a, so long as the holder unit 72 can hold the smartphone 100. Additionally, the holder holds the smartphone 100 such that a thickness direction of the smartphone 100 (shown by arrow A in FIG. 6) is approximately perpendicular to a front surface 26a of the display.

In addition, in the present embodiment, the display 26 is formed to be openable/closable with respect to the main body 28. An open/close mechanism 30 of the display 26 will be described in detail later. The display 26 can be switched between a closed state in which the holder unit 72 is positioned within the main body 28, and an open state in which the holder unit 72 is exposed to the outside. More specifically, when the display 26 is pushed toward the deeper side in the closed state as shown in FIG. 6, the display 26 moves straight forward, protrudes to the outer side from the surface of the dashboard 102 to form a state shown in FIG. 7, rotates forward, and assumes the open state in which the holder unit 72 is exposed to the outside, as shown in FIG. 8.

When the display 26 is to be set to the closed state, the display 26 in the open state may be pressed toward the deeper side. The holder unit 72 has a size to allow storage of the entire smartphone 100, and the display 26 can be set to the closed state while the smartphone 100 is stored in the holder unit 72. In other words, according to the present embodiment, when the display 26 is closed, the smartphone 100 is stored completely inside the main body 28 of the DA apparatus 10. As a result, the smartphone 100 is not exposed to the outside of the DA apparatus, and unintentional contact between the smartphone 100 and the hands and fingers, blocking of the field of view by the smartphone 100, or the like can be reliably prevented.

Moreover, in the present embodiment, the harness 24 (refer to FIGS. 4 and 5) which electrically connects the DA apparatus 10 and the smartphone 100 is stored in the main body 28 of the DA apparatus 10. That is, on a frame 67 provided on the main body 28 of the DA apparatus 10, there is formed a terminal storage unit 67a which stores a connection terminal 24a provided at a tip of the harness 24 (refer to FIGS. 4 and 5). On the terminal storage unit 67a, there is formed an insertion hole 67b through which the harness 24 is inserted, and the harness 24 can move back and forth in the insertion hole 67b. When the smartphone 100 is mounted on the holder unit 72, as shown in FIG. 5, the harness 24 is extended forward, and the connection terminal 24a is connected to the smartphone 100. When the display 26 is set to the closed state in this state, the harness 24 can be stored completely inside the DA apparatus 10 along with the smartphone 100, and thus, unintentional hooking of the hands and fingers on the harness 24 can be completely prevented.

Next, a mechanical structure of the DA apparatus 100 will be described. As already described, the DA apparatus 10 can be mechanically divided into the main body 28 embedded in the dashboard 102, and the display 26 which can be opened and closed with respect to the main body 28. On the main body 28, there are mounted a plurality of iron plates 70 forming a case of the DA apparatus 10, and a plurality of circuit boards 68 forming the controller 20 and the memory 22.

In front of the circuit boards 68, a base member 62 is placed, and a separation plate 64 is fixed on the base member 62. The separation plate 64 is a member which stands approximately vertical, and a plurality of insertion holes 64b through which a forward/backward movement bar 54a passes are formed near a central area of the separation plate 64.

The base member 62 is a member which is fixed on the case of the DA apparatus 10. On the ends in the width direction of the base member 62, a side wall 74 which stands approximately vertical is provided. The side wall 74 is a constituting element of the open/close mechanism 30 which switches the open/close states of the display 26. On the side wall 74, there are formed an arm hole 74a through which an arm 56 is inserted, a guide hole 74b for guiding movement of a guiding protrusion 58a, or the like, which will be described later in detail.

Further, on the base member 62, a placement arm for attaching a lock switch 66 is provided in a standing manner. The lock switch 66 also is a constituting element of the open/close mechanism 30 which switches the open/close states of the display 26. The lock switch 66 can assume an engaged state where the lock switch 66 engages a part of the display 26 and maintains the closed state, and a disengaged state in which the engagement is released. The state of the lock switch 66 can be switched by pressing a movable pin 82 protruding on a front surface of the lock switch 66.

On a front surface of the base member 62, a forward/backward movement plate 54 is provided. The forward/backward movement plate 54 is a plate member having an approximate flat plate shape, and a plurality of the forward/backward movement bars 54a extending in the horizontal direction are provided on a back surface of the forward/backward movement plate 54. As already described, the forward/backward movement bar 54a is inserted into the insertion hole 64b of the separation plate 64 which is fixedly provided, and the forward/backward movement plate 54 can be moved forward and backward with respect to the separation plate 64. In addition, a coil spring 60 which urges the forward/backward movement plate 54 in the open direction is attached to the forward/backward movement bar 54a.

As already described, the display 26 comprises the panel 40, the electrode 42, the relay board 48, the housing 44, and the cover 50. Of these elements, on a back surface of the cover 50, the frame member 50a forming the holder unit 72 is formed. A cover side engagement member 50b which engages the lock switch 66 protrudes from an end on the back surface of the cover 50 (refer to FIGS. 9 and 10). In addition, a pusher 52 which contacts the lock switch 66 is attached near the cover side engagement member 50b. Near a lower end of the cover 50, a guide member 58 is fixed, and the cover 50, and, consequently, the entire display 26 to which the cover 50 is assembled, is moved forward and backward, and is rotated along with the guide member 58. Further, the arm 56 is also attached to the cover 50. The arm 56 moves forward and backward along with the cover 50 and the guide member 58, but does not rotate with the cover 50 or the like. The arm 56 always maintains a horizontal orientation.

Figure 9:
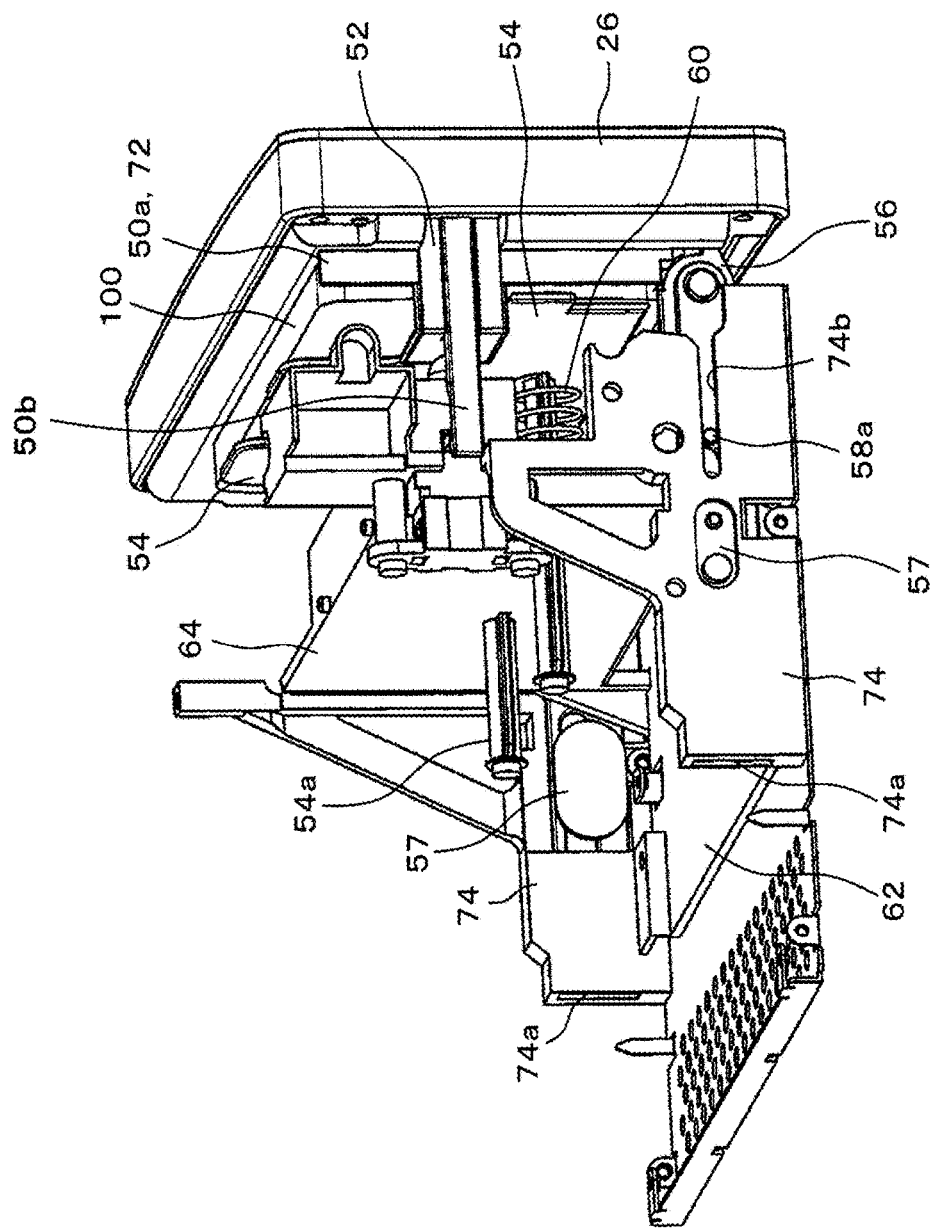
FIG. 9 is a diagram for explaining an open/close operation of a display.
Figure 10:
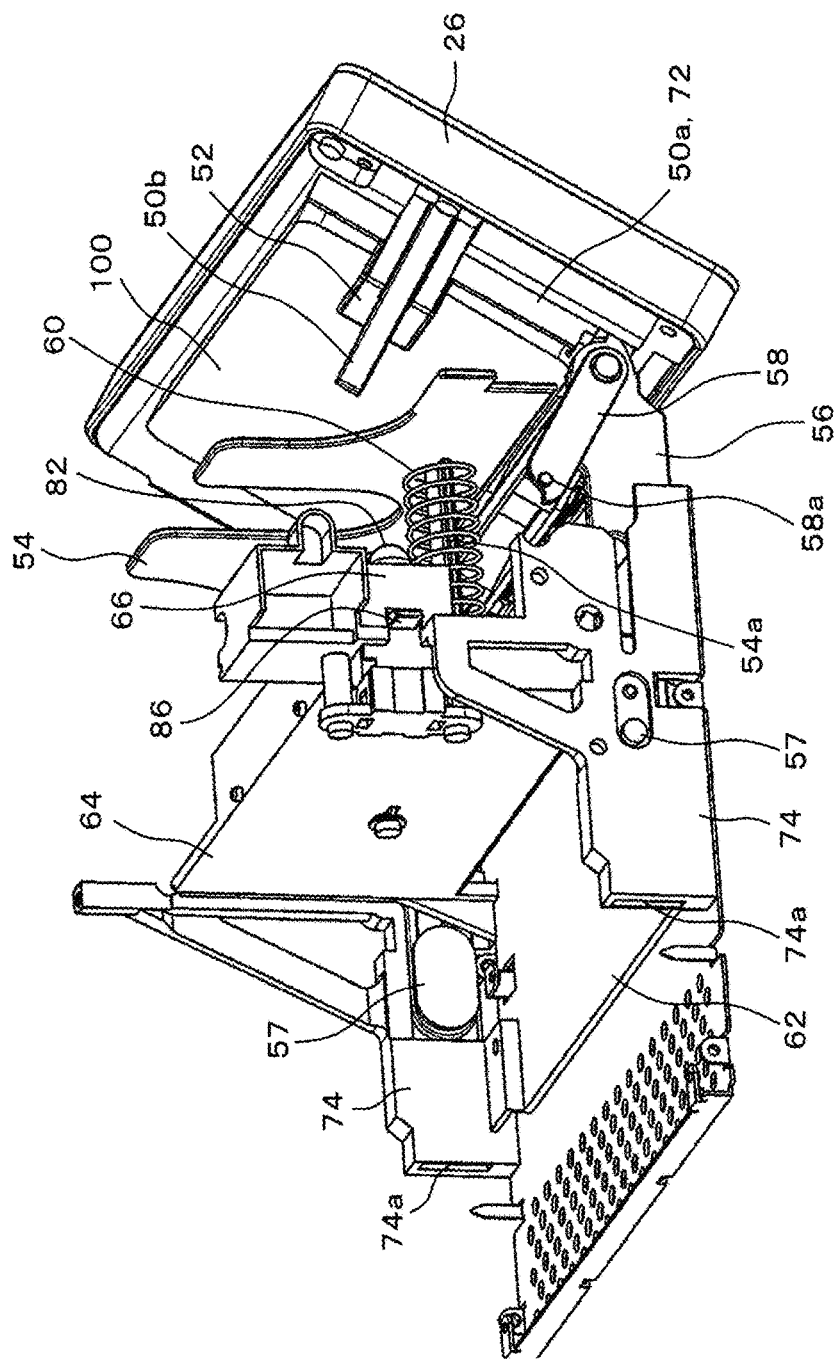
FIG. 10 is a diagram for explaining an open/close operation of the display.

Next, a mechanism for opening or closing the display 26 in the DA apparatus 10 having such a structure will be described with reference to FIGS. 9 and 10. FIGS. 9 and 10 are both perspective views emphasizing the members contributing the opening/closing of the display 26 in the DA apparatus 10. FIG. 9 shows the closed state and FIG. 10 shows the open state.

The open/close mechanism 30 which opens and closes the display 26 with respect to the main body 28 comprises the base member 62, the forward/backward movement plate 54, the arm 56, the guide member 58, the lock switch 66, or the like. Specifically, in the closed state, the cover side engagement member 50b is engaged with a switch side engagement member 86 provided on the lock switch 66. When the display 26 is pressed in this state, the engagement between the two engagement members 50b and 86 is released. When the engagement members are disengaged, the forward/backward movement plate 54 and the display 26 positioned in front of the forward/backward movement plate 54 move forward by an urging force of the coil spring 60 which urges the forward/backward movement plate 54 forward.

Here, because the guiding protrusion 58a formed in the guide member 58 is passed through the guide hole 74b formed on the side wall 74, the guide member 58, and, consequently, the display 26, is moved in a direction along the guide hole 74b; that is, forward in the horizontal direction.

During the process of moving forward, the guiding protrusion 58a moves out from the guide hole 74b, and becomes rotatable with respect to the arm 56. In addition, the arm 56 inserted into the arm hole 74a of the side wall 74 contacts an arm stop 57 attached to the side wall 74 after moving forward for a certain distance, the forward movement thereof is restricted, and further forward movement of the display 26 is prevented. When the display 26 is set in this state, the display 26 is rotated forward about a junction axis with the arm 56 by its own weight. As a result, the open state as shown in FIG. 10 is achieved. Alternatively, in order to more actively rotate the display 26, an elastic member for rotation which urges the cover 50 in the forward direction may be provided between the forward/backward movement plate 54 and the cover 50.

In order to set the display 26 in the open state to the closed state, the display 26 may be pressed toward the deeper side against the urging force of the coil spring 60. When the display 26 is pressed to a position where the pusher 52 presses the lock switch 66, a part of the lock switch 66 engages the cover side engagement member 50b, and the closed state is maintained.

Here, even in the closed state, the forward/backward movement plate 54 always presses the cover 50 in the forward direction by the urging force of the coil spring 60. In the case where the smartphone 100 is stored in the holder unit 72, the forward/backward movement plate 54 presses the smartphone 100 toward the side of the cover 50. As a result, rattling and vibration of the smartphone 100 in the holder unit 72 can be effectively prevented, along with uncomfortable vibration sound and damages to the smartphone 100 due to the vibration and shock. In addition, as is clear from the description above, in the present embodiment, a common member is used for the elastic member for opening and closing the display 26 and the elastic member for preventing rattling of the smartphone 100. As a result, the number of components can be reduced, and the DA apparatus 10 can be formed with a reduced cost.

Figure 11A:
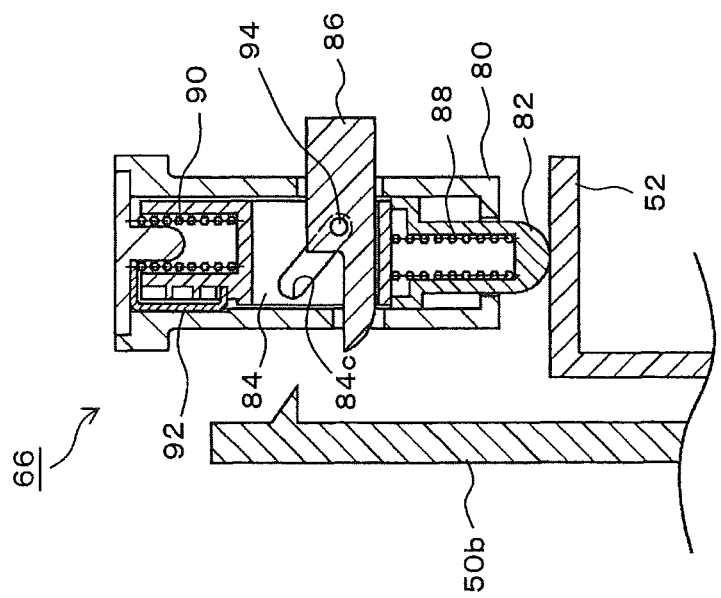
FIG. 11A is a cross sectional diagram of a lock switch in an engaged state.
Figure 11B:
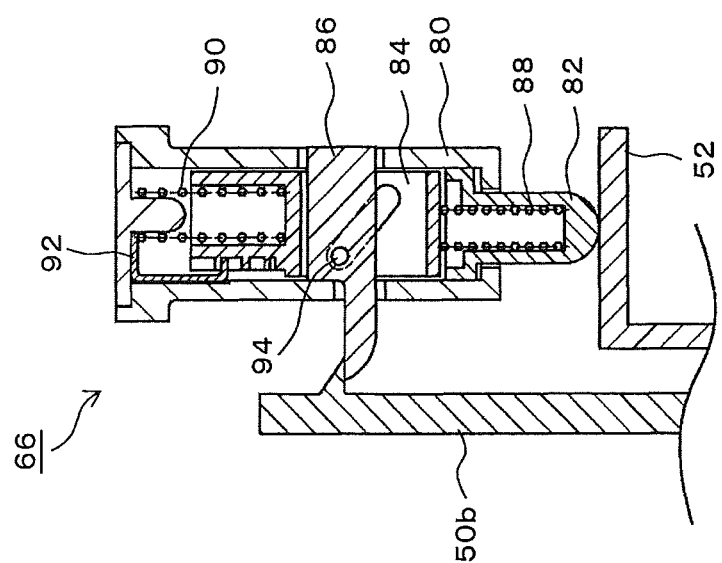
FIG. 11B is a cross sectional diagram of the lock switch in a disengaged state.
Figure 12:
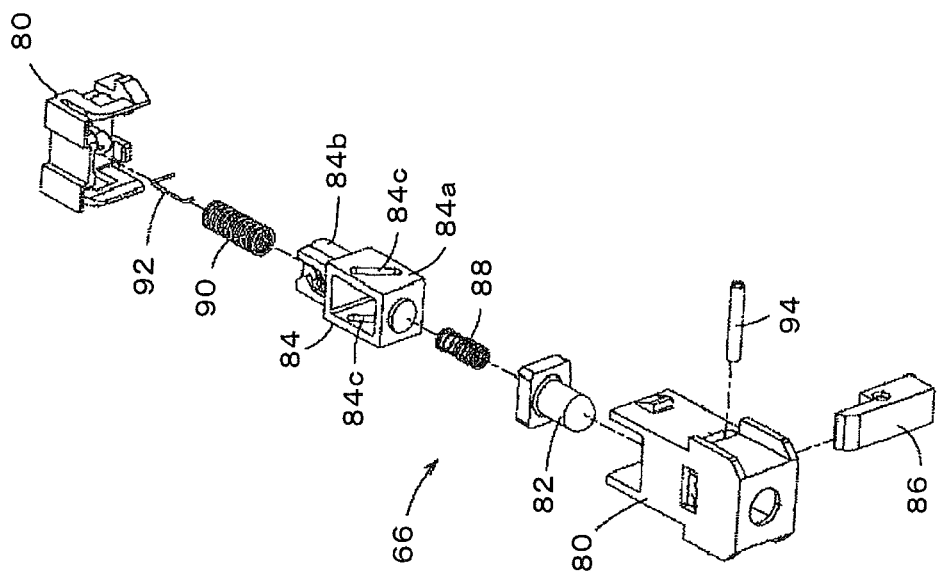
FIG. 12 is an exploded perspective view of the lock switch.

The structure of the lock switch 66 is not particularly limited so long as the lock switch 66 can be switched between the engaged state and the disengaged state, and known structures may be employed, such as a structure disclosed in JP 2006-137224 A. FIGS. 11A and 11B are diagrams showing an example structure of the lock switch 66. FIG. 11A shows the engaged state and FIG. 11B shows the disengaged state. FIG. 12 is an exploded perspective view of the lock switch 66.

The lock switch 66 comprises a housing 80 having a rectangular tube shape and which is fixedly placed, the movable pin 82 and a sliding member 84 which move forward and backward in the housing 80, the switch side engagement member 86 which moves forward and backward in the radial direction of the housing 80, and elastic members 88 and 90 which urge the movable pin 82 and the sliding member 84.

The movable pin 82 and the sliding member 84 are urged by the first and second elastic members 88 and 90 in the forward direction (downward in the figures). A tip of the movable pin 82 protrudes from a hole formed on a tip surface of the housing 80 toward the outside, and contacts the pusher 52.

The sliding member 84 has a box-shaped unit 84a having two opposing surfaces opened, and a cam unit 84b connected to the box-shaped unit 84a. Of the box-shaped unit 84a, on two surfaces orthogonal to the movement direction, there is formed a cam hole 84c extending in a slanted direction toward the front direction so that the cam moves toward the disengagement direction (right direction in the figures). A shaft 94 attached to the switch side engagement member 86 is inserted through the cam hole 84c.

In the lock switch 66 having the above-described configuration, in the engaged state, as shown in FIG. 11A, the sliding member 84 and the movable pin 82 are moved forward (downward in the figures), and the switch side engagement member 86 is engaged with the cover side engagement member 50b. In this state, the cover side engagement member 50b, and consequently, the display 26, cannot move forward, and the closed state can be maintained.

In this state, when the movable pin 82 is pressed toward the deeper side by the pusher 52, the movable pin 82 and the sliding member 84 are both moved toward the deeper side (upward in the figure). With this movement, the shaft of the switch side engagement member 86 moves along the cam hole 84c, and, consequently, the switch side engagement member 86 moves in the disengagement direction (right direction in the figure). As a result, the engagement between the switch side engagement member 86 and the cover side engagement member 50b is released, to achieve the state of FIG. 11B. When the pressing by the pusher 52 is released, the sliding member 84 and the movable pin 82 move in the forward direction again by the urging force of the elastic member.

When the state is to be returned from the disengagement state to the lock state, the display 26 can be pressed toward the deeper side, to press the movable pin 82 with the pusher 52 again toward the deeper side. With such a process, the movable pin 82 and the sliding member 84 again move toward the deeper side, the switch side engagement member 86 moves in the lock releasing direction, and the state of FIG. 11B is achieved. The cover side engagement member 50b moves with the pusher 52 toward the deeper side, and in this process, because the cover side engagement member 50b does not interfere with the switch side engagement member 86, the cover side engagement member 50b can be moved completely to the deeper side. After the switch side engagement member 86 has moved completely to the deeper side, the pressing by the pusher 52 may be released so that the movable pin 82 and the sliding member 84 move forward by the urging force of the elastic member, and, consequently, the switch side engagement member 86 also moves in the engagement direction (left direction in the figure). Finally, the lock state as shown in FIG. 11A is achieved.

The structure of the lock switch 66 described herein, however, is merely exemplary, and other structures may be employed so long as the engagement state with a part of the display 26 can be suitably switched. For example, in the present embodiment, the lock switch 66 which mechanically switches between the engagement and disengagement states is employed, but alternatively, the engagement and disengagement may be electrically switched. For example, a button for switching between open/closed states may be provided on the display 26, and the engagement and disengagement may be switched by use of an electromagnetic plunger or the like which moves forward and backward upon receiving a pressing signal of the button.

Further, so long as the transportable information terminal can be held on the back surface of the display 26 of the DA apparatus 10, the other structures may be suitably modified. For example, in the present embodiment, during the opening operation of the display 26, the display 26 is slid forward and then rotated forward. However, it is also possible to execute only one of the forward sliding and the forward rotation if a sufficient space can be secured for setting the smartphone 100. Further, in place of the sliding or the rotating forward, it is also possible to employ a structure in which the opening/closing operations are done by rotating about a vertical axis provided at left and right ends of the display 26; that is, a single-swing door structure.

In addition, in the present embodiment, the smartphone 100 and the DA apparatus 10 are electrically connected via the harness 24, but alternatively, other connection forms may be employed so long as the electric connection member can be stored completely inside the DA apparatus 10. For example, a connection terminal may be fixedly placed at a position which contacts the connection terminal of the smartphone 100 when the smartphone 100 is set in the holder unit 72, so that, upon setting the smartphone 100 on the holder unit 72, the connection terminal of the DA apparatus 10 and the connection terminal of the smartphone 100 are automatically connected to each other. In addition, the electrical connection member is not limited to a wired structure and may be a wireless structure, so long as the electric signals can be exchanged.

Moreover, in the present embodiment, a DA apparatus which is connected to the smartphone 100 is exemplified, but the information terminal is not limited to the smartphone, and the DA apparatus may be connected to a PDA or a tablet terminal, so long as the information terminal is a transportable information terminal.

In either configuration, by providing the holder unit of the transportable information terminal on the back surface of the display 26 of the DA apparatus, it becomes possible to improve the appearance and to effectively prevent problems such as damages of the information terminal and blocking of the field of view by the information terminal.

REFERENCE SIGNS LIST

10 DA APPARATUS; 12 LIQUID CRYSTAL DISPLAY; 14 SPEAKER; 16 TOUCH PANEL; 18 MICROPHONE; 20 CONTROLLER; 22 MEMORY; 23 CHARGER; 24 HARNESS; 26 DISPLAY; 28 MAIN BODY; 30 OPEN/CLOSE MECHANISM; 40 PANEL; 42 ELECTRODE; 44 HOUSING; 46 TFT; 58 RELAY BOARD; 50 COVER; 52 PUSHER; 54 FORWARD/BACKWARD MOVEMENT PLATE; 56 ARM; 58 GUIDE MEMBER; 60 COIL SPRING; 62 BASE MEMBER; 64 SEPARATION PLATE; 66 LOCK SWITCH; 67 FRAME; 68 CIRCUIT BOARD; 70 IRON PLATE; 72 HOLDER UNIT; 74 SIDE WALL; 80 HOUSING; 82 MOVABLE PIN; 84 SLIDING MEMBER; 86 SWITCH SIDE ENGAGEMENT MEMBER; 88, 90 ELASTIC MEMBER; 94 SHAFT; 100 SMARTPHONE; 102 DASHBOARD.

The invention claimed is:

1. A display audio apparatus that is equipped on a vehicle and that cooperates with an information terminal to output information, the display audio apparatus comprising:
   a main body that is fixed on a fixed member;
   a display which can be opened and closed with respect to the main body;
   a holder that holds the information terminal, the holder being fixedly connected to a back surface of the display such that the holder moves with the display;
   an electric circuit that is provided on the main body, that displays, on the display, information which is output from the information terminal held on the holder, and that transmits an operation instruction from a user to the information terminal; and
   an open/close mechanism that switches the display between an open state in which the holder is exposed to an outside of a case, and a closed state in which the holder is positioned inside the main body;
   wherein the holder is structured to hold the information terminal such that a thickness direction of a shortest side of the information terminal is approximately perpendicular to a front surface of the display; and
   wherein the holder is structured to hold the information terminal such that the information terminal and the display are stacked in the thickness direction of the shortest side of the information terminal and the display.

2. The display audio apparatus according to claim 1, wherein
   the open/close mechanism comprises an urging member that urges the display forward, wherein the urging member moves the display in an open direction when the closed state is released, and causes the information terminal held on the holder to closely contact a wall surface of the holder in the closed state.

3. The display audio apparatus according to claim 1, further comprising:
   a harness that electrically connects the information terminal held on the holder and the electric circuit, wherein
   in the closed state, the harness is stored in the main body in a connected state to the information terminal.

4. The display audio apparatus according to claim 1, wherein the open/close mechanism is structured to move the holder and the display in a linear direction and also to rotate the holder and the display around a rotation axis, the rotation axis being perpendicular to the linear direction.

* * * * *